United States Patent [19]

Grosseau

[11] 3,982,840
[45] Sept. 28, 1976

[54] UNIVERSAL JOINT WITH ASSEMBLY FEATURE

[75] Inventor: Albert Grosseau, Chaville, France

[73] Assignee: Societe Anonyme Automobiles Citroen, Berliet, Panhard, France

[22] Filed: Dec. 15, 1975

[21] Appl. No.: 640,779

[30] Foreign Application Priority Data
Dec. 19, 1974  France .............................. 74.43210

[52] U.S. Cl. ............................ 403/14; 403/57; 29/434; 29/148.4 A; 29/148.4 C; 64/7; 64/21
[51] Int. Cl.² .................... B25G 3/00; F16B 1/00; F16D 1/00; F16G 11/00
[58] Field of Search ................ 403/14, 57; 64/7, 8, 64/21; 29/148.4 A, 148.4 C, 434; 308/194

[56] References Cited
UNITED STATES PATENTS

| 2,997,864 | 8/1961 | Rueb | 64/7 X |
|---|---|---|---|
| 3,026,085 | 3/1962 | Whippen et al. | 415/500 X |
| 3,176,960 | 4/1965 | Sproule | 415/141 UX |
| 3,263,800 | 8/1966 | Vissers | 403/57 X |
| 3,361,494 | 1/1968 | Galle | 29/434 X |
| 3,891,286 | 6/1975 | Zimmer et al. | 308/194 X |
| 3,935,717 | 2/1976 | Welshof | 64/21 |

*Primary Examiner*—Wayne L. Shedd
*Attorney, Agent, or Firm*—Karl F. Ross; Herbert Dubno

[57] ABSTRACT

A universal joint comprises an external cup-like element, and a part spherical head located in the element. Three balls are interposed between opposing surfaces of the head and the element and are engaged in pairs of grooves in the head and in the element. The balls are retained in slots in a cage. An auxiliary groove is formed in the external element adjacent one of the ball-receiving grooves and is spaced therefrom by a surface having a width less than that of the slots in the cage whereby this surface can be located in one of the slots during assembly of the joint to permit insertion of the cage into the external element.

2 Claims, 6 Drawing Figures

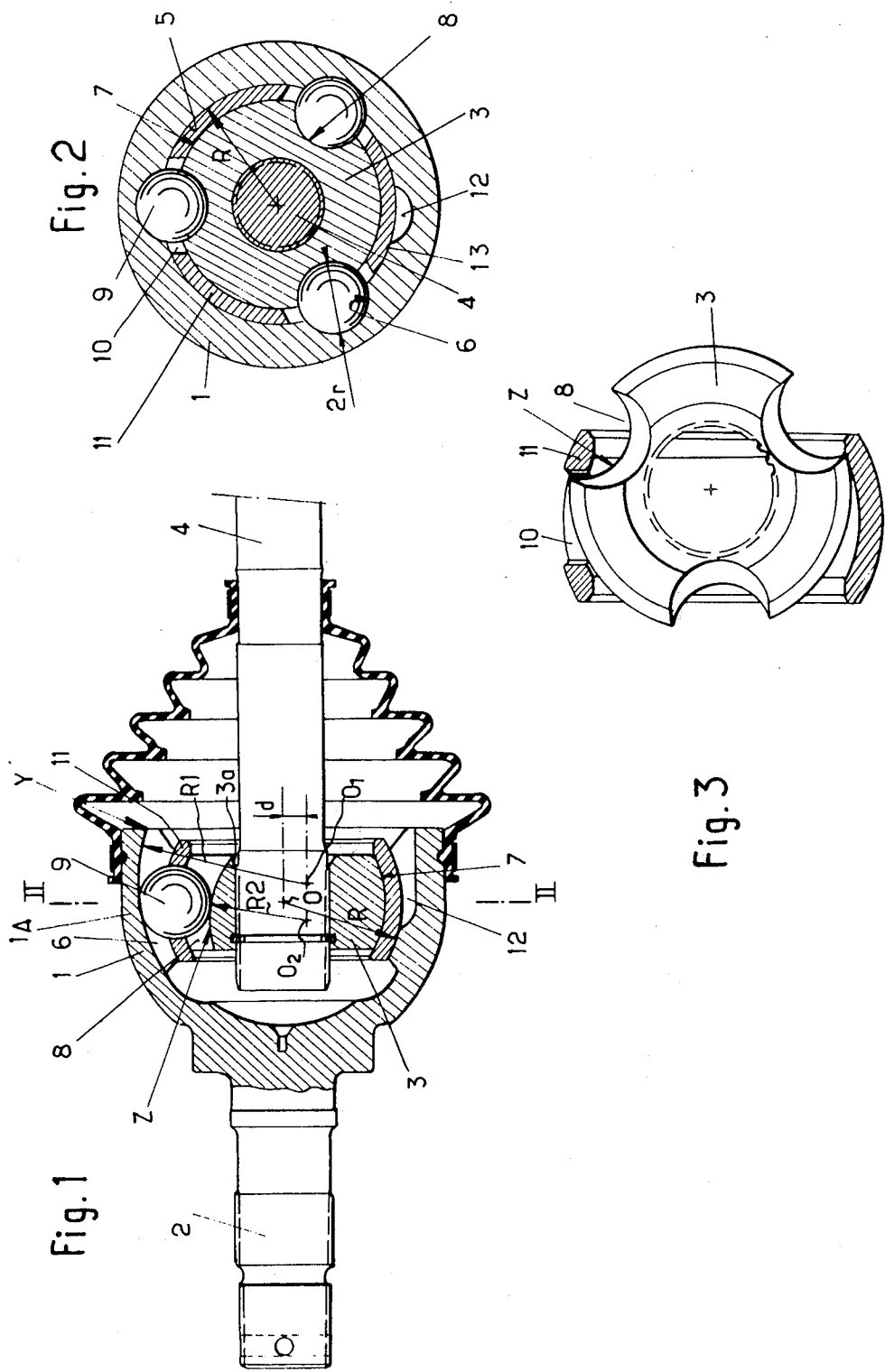

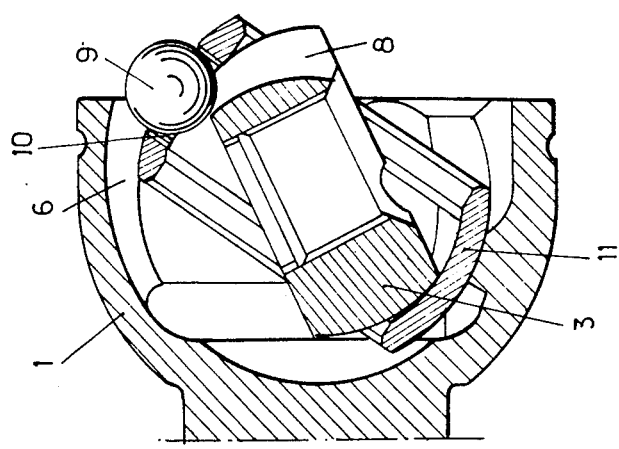
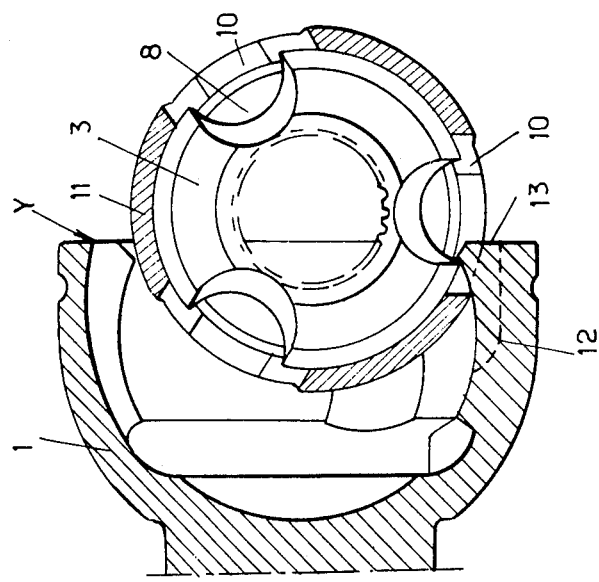
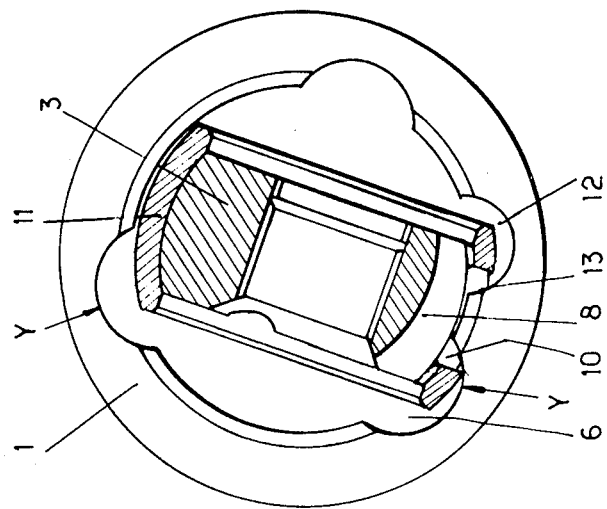

UNIVERSAL JOINT WITH ASSEMBLY FEATURE

BACKGROUND OF THE INVENTION

1. Field of the Invention.

The present invention relates to universal joints.

2. Description of the Prior Art.

There have been proposed universal joints comprising an external cup-like element, and an internal element between which balls are interposed, the balls being held in slots of a spheroidal guide cage and being engaged in pairs of grooves in the internal and external element, the grooves being of generally toroidal form. Hitherto such joints generally have six balls engaged in like number of pairs of grooves.

An attempt has been made at making joints having fewer than six balls and fewer than six pairs of grooves in order to simplify machining, but this has hitherto been obtained only at the cost of additional machinings which are likely to weaken certain elements of the joint, in particular the cage.

SUMMARY OF THE INVENTION

According to the present invention, there is provided in a universal joint, an external cup-like element, an internal element located within the external element, means defining three pairs of opposed grooves formed respectively in the external and internal elements, said grooves being generally of toroidal form, a spheroidal guide cage having slots, three balls each located in a respective one of the slots and engaged in a respective one of the pairs of grooves, and means defining a further groove in the external element, said further groove being spaced from one of said opposed grooves to define therebetween a bearing surface, the width of which is less than that of one of said slots whereby the bearing surface can be introduced into a said slot by a sufficient distance to permit introduction of the cage into the external element.

In a preferred embodiment of the invention, in each said element, each groove is symmetrical about a plane passing through the axis of the element, and the grooves of each said pair of grooves have sections, in the plane of symmetry, in the form of an arc, the centers of curvature of the arcs of the respective grooves of each pair are, when the axes of the internal and external elements are coincident, arranged at opposite sides of a central transverse plane of the joint, and the centers of curvature of the arcs of the respective grooves of each pair are, when the axes of the internal and external elements are coicident, displaced radially by the same distance from said coicident axes. The radially displacement of the centers of curvature of the arcs acts to increase the radii of curvature of the arcs. This arrangement permits the depth of the grooves to be increased while retaining an adequate thickness at the ends of the grooves of the internal element.

BRIEF DESCRIPTION OF THE DRAWINGS

An embodiment of the invention will now be described, by way of example only, with reference to the accompanying diagrammatic drawings, in which:

FIG. 1 is an axial section of a joint in accordance with the invention;

FIG. 2 is a section taken on line II—II of FIG. 1; and

FIGS. 3 to 6 are sections showing the method of assembly of the joint.

DESCRIPTION OF THE PREFERRED EMBODIMENT

As shown in the drawings, the joint comprises an external cup-like element 1 which is integral with a shaft 2, and a part-spherical head 3 integral with a shaft 4. The joint may in particular be used in a motor vehicle transmission, for example for joining a steering and driving wheel shaft to a differential output shaft.

A spherical cavity, having a center O and a radius R, is defined inside the element 1. In the wall 5 of this cavity there are machined three toroidal grooves 6 each of which is symmetrical about a respective plane passing through the axis of the element 1, the grooves 6 being disposed at 120° relative to each other. The bottom section of each of the grooves 6 in its plane of symmetry is an arc of a circle of radius $R_1$ and having its center $O_1$ situated on the opposite side of the axis of the element 1 and located axially outwardly relative to the center O; the radius $R_1$ is greater than R.

A part-spherical wall 7 of the head 3 has its center at O. In this wall there are machined three toroidal grooves 8 each symmetrical about a respective plane passing through the axis of the head 3, the grooves 8 being disposed at 120° relative to each other. The bottom section of each of the grooves 8 in its plane of symmetry is an arc of a circle of radius $R_2$ having its center $O_2$ situated, when the two shafts 2 and 4 are aligned, on a straight line parallel with the axis of the head 3 and passing through the center $O_1$, the two centers thus being offset by the same distance $d$ relative to the common axis of the element 1 and the head 3. The centers $O_1$ and $O_2$ are symmetrical relative to a transverse plane passing through the center O and are spaced from this plane by a distance less than half the thickness of the head 3; the radius $R_2$ of the arcs defining the bottom of the grooves 8 is less than R. The radius $r$ of the transverse cross-section of the grooves 8 is equal to that of the transverse cross-section of the grooves 6. The offset $d$ permits an increase in the depth of the grooves 8 in the base portion Z, while enabling the portions 3a of the head to be of sufficient thickness, and increases the depth of the grooves 6 at their outer end Y, while enabling the portions 1a of the element 1 to be of adequate thickness.

Balls 9 are interposed between the element 1 and the head 3; the balls 9 have a radius $r$ and are held in slots 10 of a part-spherical cage 11, and are able to roll in the grooves 6 and 8. The balls 9 are in contact with the walls of the grooves 6 and 8 and, when the shafts 2 and 4 are coaxial, have their centers situated in a plane perpendicular to the common axis of the shafts and passing through the center O. For this purpose, the difference between the radii $R_1$ and $R_2$ must be close to the diameter $2r$ of the balls 9.

The slots 10 have a width equal, except for the play, to the diameter $2r$ of the balls. Since the distance between the balls depends upon the steering lock, the length of the slots has the desired value to permit the steering lock necessary for the positioning of the balls in the slots; this length is, in any case, greater than the thickness of the head 3 to permit its assembly inside the cage, as will be described hereinafter.

The element 1 has an auxiliary groove 12 which is shorter than the grooves 6 and is situated in an axial plane adjacent to one of the grooves 6, in such a manner that the length of a bearing surface 13 defined between this groove 6 and the groove 12 is substantially less than the width of the slots 10, that is to say, the diameter of the balls 9.

The joint is assembled by initially placing the head 3 in position in the cage 11. For this purpose, the head 3 is placed perpendicularly to the cage 11 and the head 3 is inserted into one of the slots 10, with one of the edges of this slot engaging into one of the grooves 8 (FIG. 3). The head 3 may then be introduced into the cage because of the depth of the groove 8 in the base portion Z, and then the head 3 is pivoted in such a manner that it is located entirely inside the cage 11.

Then the assembly of the head 3 and the cage 11 is placed into the element 1. For this purpose, this assembly is placed perpendicularly to the element 1 with the grooves 8 being situated facing the slots 10, and the bearing surface 13 is inserted into one of these slots and into the corresponding groove 8 (FIGS. 4 and 5). The cage 11 can then be introduced into the element 1 on account of the sufficient depth of the groove 6 at its end Y; it is then pivoted in such a manner that it comes entirely inside the element 1.

There remains only to place the balls 9 in position, an operation which is affected by disposing the slots 10 in front of the grooves 6 and the grooves 8 in front of the slots 10, slanting the cage 11 and the head 3 by an angle sufficient to release a slot 10, and introducing a ball 9 into the slot 10, this operation being repeated in turn for the two other balls (FIG. 6).

The joint particularly described has the advantage of requiring a fewer number of components than standard joints of this type and of requiring much simpler machining, since the grooving of the external cup-like element can be effected without any special precision. The load of the three balls is constantly distributed in even manner and the cage is in isostatic balance; on the contrary, in a standard six-ball joint, the balls cannot all simultaneously bear on the bottom of grooves and against the edges of the slots of the cage, unless very high precision machining is performed, Moreover, the head, although it has three grooves only, may be mounted in usual manner in the cage and the assembly composed of the head and of the cage can be introduced into the bowl as a consequence of the presence of the internal grooving and of the relatively substantial depth of the grooves.

What is claimed is:

1. In a universal joint,
   an external cup-like element,
   an internal element located within the external element,
   means defining three pairs of opposed grooves formed respectively, in the external and internal elements, said grooves being generally or toroidal form,
   a spheroidal guide cage having slots,
   three balls each located in a respective one of the slots and engaged in a respective one of the pairs of grooves, and
   means defining a further groove in the external element, said further groove being spaced from one of said opposed grooves to define therebetween a bearing surface, the width of which is less than that of one of said slots whereby the bearing surface can be introduced into a said slot by a sufficient distance to permit introduction of the cage into the external element.

2. A joint according to claim 1, in which in each said element, each groove is symmetrical about a plane passing through the axis of the element, and the grooves of each said pair of grooves have sections, in the plane of symmetry, in the form of an arc, the centers of curvature of the arcs of the respective grooves of each pair are, when the axes of the internal and external elements are coicident, arranged at opposite sides of a central transverse plane of the joint, and the centers of curvature of the arcs of the respective grooves of each pair are, when the axes of the internal and external elements are coincident, displaced radially by the same distance from said coincident axes.

* * * * *